United States Patent
Windross

[19]

[11] Patent Number: 5,147,128
[45] Date of Patent: Sep. 15, 1992

[54] FIBEROPTIC MULTI-BEAM ROADWAY ILLUMINATION DEVICE

[75] Inventor: Gene R. Windross, Westland, Mich.

[73] Assignee: Ford Motor Company, Dearborn, Mich.

[21] Appl. No.: 811,253

[22] Filed: Dec. 20, 1991

[51] Int. Cl.$^5$ .............................................. F21V 7/04
[52] U.S. Cl. ........................................ 362/32; 385/74; 385/93
[58] Field of Search .................... 362/32; 385/35, 74, 385/93, 119, 901

[56] References Cited

U.S. PATENT DOCUMENTS

| | | | |
|---|---|---|---|
| 3,950,075 | 4/1976 | Cook et al. | 385/93 |
| 4,307,934 | 12/1981 | Palmer | 385/93 |
| 4,451,115 | 5/1984 | Nicia et al. | 385/74 |
| 4,468,087 | 8/1984 | Milan et al. | 385/74 |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,958,263 | 9/1990 | Davenport et al. | 362/32 |
| 5,058,985 | 10/1991 | Davenport et al. | 362/32 |

OTHER PUBLICATIONS

"60e Salon International de l'Automobile, Neutral Territory, Mixing business and pleasure at the Geneva auto show", Road and Track 1990, pp. 62≧64.
"Trends", Motor Trend, Jun. 1990, pp. 24–25.
"Level 1–32 Stories", computer print-out of Nexis search.

*Primary Examiner*—Carroll B. Dority
*Attorney, Agent, or Firm*—Damian Porcari; Roger L. May

[57] ABSTRACT

A fiberoptic multi-beam roadway illumination device includes a single lens which may be a spherical, vertical cylindrical or horizontal cylindrical lens having a center and a longitudinal axis extending through the center, and at least two separate serial arrangements of fiberoptic conductors and apertures defining separate beam light paths extending in a predetermined aligned relationship with the longitudinal axis of the lens for inputting beam light into the lens to thereby respectively project separate multiple beams of light. A single light source and light control may be used to individually or sequentially cause to be projected the separate multiple beams of light. Alternatively multiple light sources which may be of different color may be used along with a light control to individually, sequentially or simultaneously project different separate colored beams of light.

14 Claims, 3 Drawing Sheets

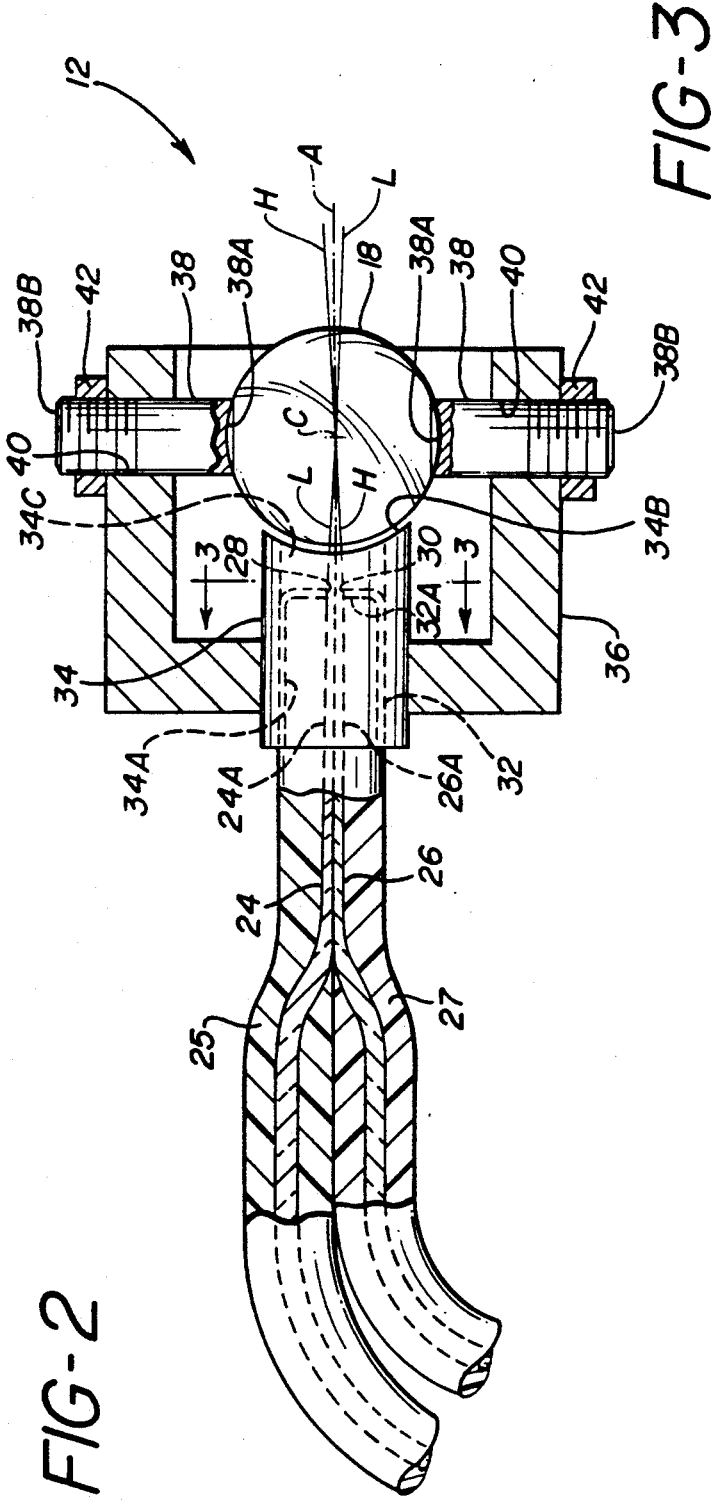

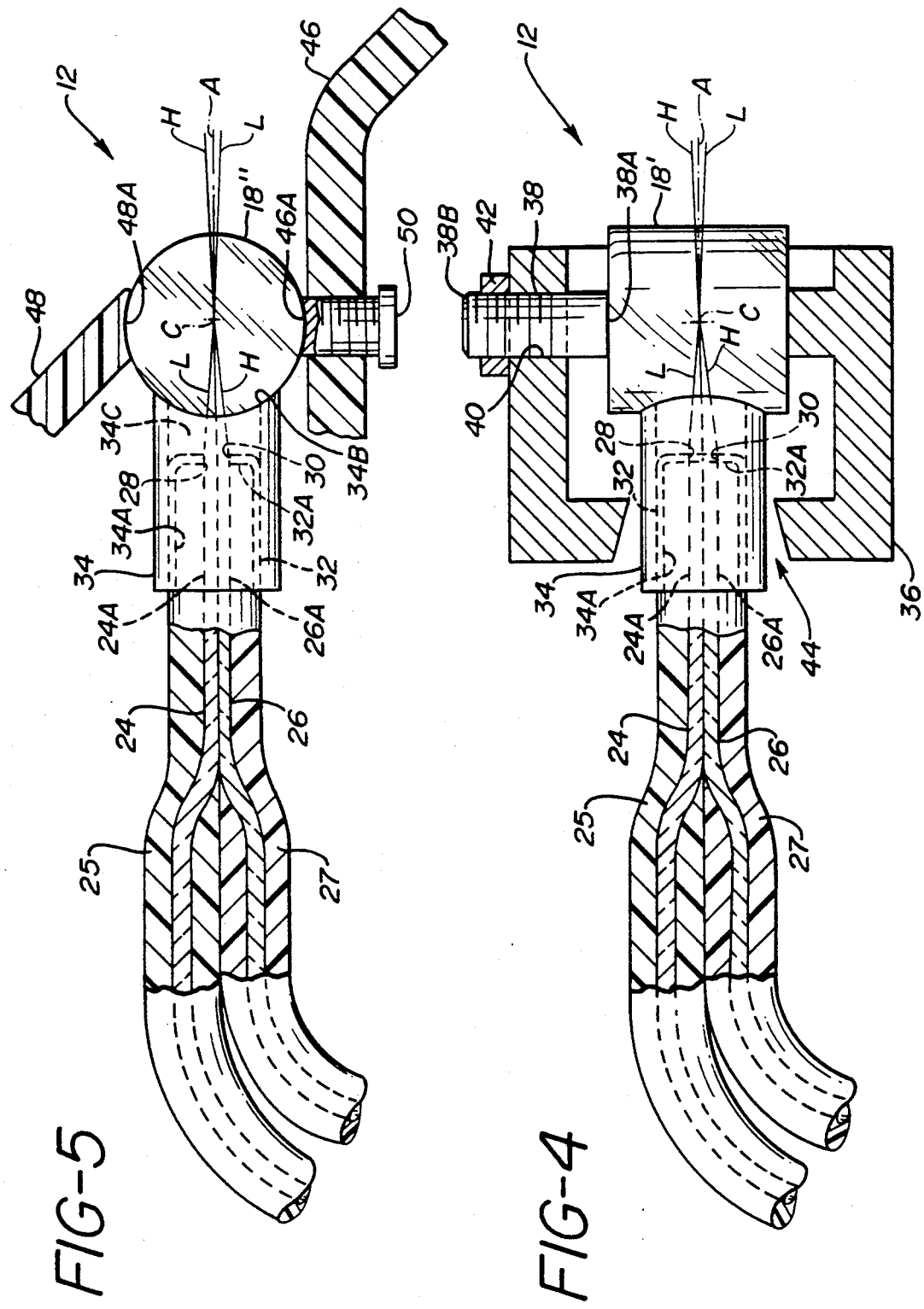

FIBEROPTIC MULTI-BEAM ROADWAY ILLUMINATION DEVICE

CROSS REFERENCE TO RELATED APPLICATION

Reference is hereby made to copending patent application, by the same applicant and assigned to the same assignee, disclosing related subject matter entitled "Fiberoptic Wide-Angle Illuminating Device", U.S. Ser. No. 811,258, filed Dec. 20, 1991.

BACKGROUND OF THE INVENTION

The present invention relates generally to fiberoptic lighting systems and, more particularly, to a fiberoptic multi-beam roadway illumination device having a multiple separate light paths optically coupled with a single optical lens for selectively and separately or simultaneously producing different beam patterns and/or colors.

It is well known in the field of fiberoptics that optical fibers are capable of effectively and efficiently conducting light from a common source along nonlinear paths to various locations remote from the light source without encountering substantial transmission losses. Because of this capability, there is increasing interest in the application of optical fibers to uses where space is restricted. One such use is the overall illumination needs of vehicles where space is scarce due to aerodynamic and styling considerations.

The application of optical fibers to vehicular illumination needs is proposed in U.S. Pat. No. 4,811,172 to Davenport et al., U.S. Pat. No. 4,868,718 to Davenport et al., U.S. Pat. No. 4,949,227 to Finch et al., and U.S. Pat. No. 4,958,263 to Davenport et al., all assigned to General Electric Company. Different approaches to providing forward low and high beam illumination patterns for vehicles are disclosed in U.S. Pat. Nos. 4,811,172, 4,868,718 and 4,949,227. An approach to providing a centralized lighting system for aerodynamically styled vehicles which employs a high intensity light source is disclosed in U.S. Pat. No. 4,958,263.

These different approaches to providing high and low beam illumination may fulfill illumination needs of vehicles. However, major shortcomings of each approach are the excessive size of the illumination device and multiplicity and complexity of parts used by the device. In view of these shortcomings, the illumination devices of the aforementioned patents fail to accommodate space limitations dictated by vehicular aerodynamic and styling requirements. Thus, there is still a need for a fiberoptic high and low beam device and other multi-beam illumination devices that will satisfy illumination requirements while avoiding the aforementioned shortcomings.

SUMMARY OF THE INVENTION

This need is met by the fiberoptic multi-beam roadway illumination device of the present invention. The roadway illumination device includes means defining multiple separate light paths optically coupled with a single optical lens, which is preferably spherical or cylindrical, for selectively and separately or simultaneously producing different beam patterns and/or colors. The multiple light paths are defined by separate serial arrangements of fiberoptic conductors and apertures which receive light separately from a light source or multiple light sources. It is readily apparent that the approach adopted by the present invention will result in a roadway illumination device that is substantially smaller in size and reduced in complexity compared to the devices of the previously-cited U.S. patents.

It is thus a feature of the present invention to provide a fiberoptic multi-beam roadway illumination device using a single optical lens for various types of illumination; to provide the roadway illumination device where separate light paths are coupled with the single optical lens for selectively and separately or simultaneously producing different beam patterns and/or colors; to provide the roadway illumination device where the separate light paths are defined by separate serial arrangements of fiberoptic conductors and apertures; and to provide the roadway illumination device as part of a lighting system including a light source or sources and a light control for selectively turning the light source or sources on and off for generating beam patterns separately or simultaneously.

An advantage of the present fiberoptic multi-beam roadway illuminating device of the present invention, in addition to its space saving features, is its ease of assembly and alignment. A singe lens is relatively easy to assemble and align. And yet the miniaturized, single lens illuminating device of the present invention has multi-beam/multi-color lighting capabilities.

Other features and advantages of the invention will become apparent from the following description, the accompanying drawings and the appended claims.

BRIEF DESCRIPTION OF THE DRAWINGS

FIG. 2 is a side elevational, partly sectioned, view of the fiberoptic multi-beam roadway illumination device of the present invention employed in the lighting system of FIG. 1;

FIG. 3 is an enlarged cross-sectional view of the illumination device taken along line 3—3 of FIG. 2;

FIG. 4 is a side elevational, partly sectioned, view showing various alternative features of the fiberoptic multi-beam roadway illumination device; and FIG. 5 is a side elevational, partly sectioned, view of another embodiment of the fiberoptic multi-beam roadway illumination device.

DETAILED DESCRIPTION OF THE PREFERRED EMBODIMENT

Figure 1:
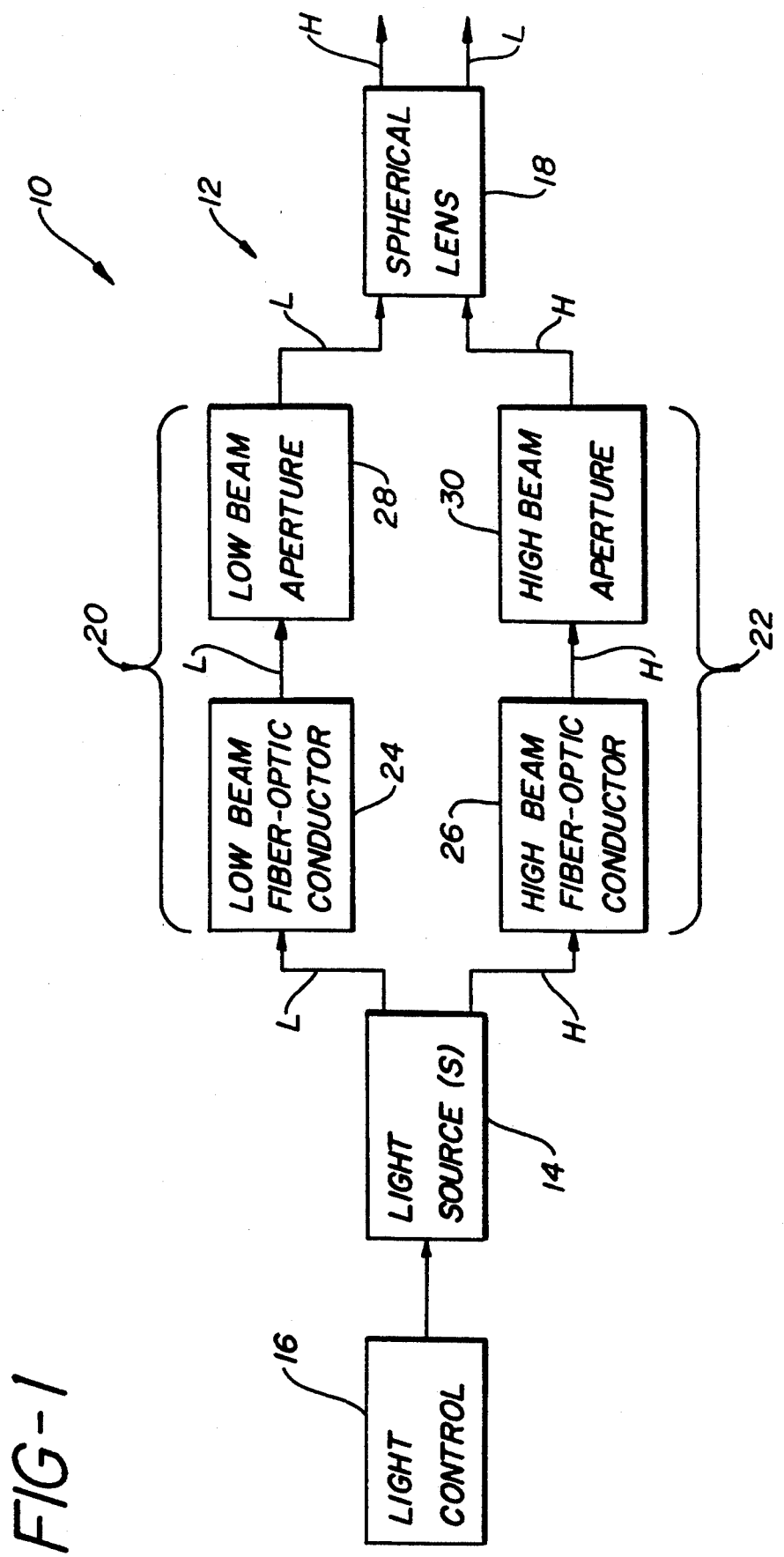
FIG. 1 is a schematic block diagram of a lighting system of the present invention for selectively and separately producing low beam and high beam illumination.

Referring to FIG. 1 of the drawings, there is illustrated a schematic block diagram of a roadway lighting system, generally designated 10, having a construction in accordance with the present invention. A preferred embodiment of a fiberoptic multi-beam roadway illumination device 12 employed in the roadway lighting system 10 is illustrated in FIGS. 2 and 3.

The multi-beam roadway illumination device 12 of the preferred embodiment is a dual beam one useful in forward lighting applications having a high beam and a low beam. Thus, the lighting system 10 includes a light source(s) 14 for separately transmitting low and high beam light "L" and "H" respectively, and a light control 16 for use in selectively and alternately turning on and off the transmitting of low and high beam light by the light source(s) 14. While the multi-beam roadway illuminating device 12 illustrated in FIG. 1 is shown in a high and low beam forward lighting arrangement, it may also be used in other forward lighting applications including driving lights, corner lights, and turn signals. Rearward lighting applications include a combined single lens for brake, turn signal and back-up.

The multi-beam roadway illumination device 12 of the lighting system 10 is composed of a single spherical lens 18 and means 20, 22 extending between the light source(s) 14 and spherical lens 18 for defining separate low and high beam light paths. It will be noted that the relative positions of the low and high beams of light, "L" and "H", outputted by the lens 18 are in the reverse of their relative positions when inputted to the lens 18.

The light source(s) 14 and the light control 16 may be conventional ones and thus will not be described in detail. Light source(s) 14 may be two or more light sources, each of which may be a different color. One suitable light source which can be utilized is described in my copending application Ser. No. 656,919, filed Feb. 19, 1991, which disclosure is incorporated herein by reference. Because the light sources can be arranged to have different exit profiles, multiple light sources and multiple beams can exist simultaneously without any overlap. In this way, a single clear lens can display two or more colors of light separately or simultaneously.

Referring now to FIGS. 1-3, as mentioned above the fiberoptic multi-beam roadway illumination device 12 basically includes the single spherical lens 18 and means 20, 22 for defining the separate paths for low and high beam light, "L" and "H". The spherical lens 18 has a center "C" and a longitudinal axis A extending through its center "C". The separate light path-defining means 20, 22 extend in a predetermined generally parallel, aligned relationship with the longitudinal axis A of the spherical lens 18. The separate light path-defining means 20, 22 are coupled to the light source(s) 14 for respectively receiving low and high beam light L, H from the light source(s) 14. The separate light path-defining means 20, 22 are also coupled to the spherical lens 18 for inputting the low and high beam light, "L" and "H", into the lens 18 respectively above and below the longitudinal axis A of the lens 18. Due to the spherical shape of the lens 18, the low and high beam light, "L" and "H" respectively cross the longitudinal axis A at the center "C" and are outputted from the spherical lens 18 in reverse fashion, respectively below and above the longitudinal axis "A" of the lens 18 to thereby respectively project the low beam of light "L" above the high beam of light "H".

The separate light path-defining means 20, 22 of the multi-beam roadway illumination device 12 basically includes a pair of separate serial arrangements of fiberoptic conductors 24, 26 and apertures 28, 30. The fiberoptic conductors 24, 26 enclosed in outer cables 25, 27 may each be a bundle of optical fibers, containing a large number of individual filaments. Alternatively, the fiberoptic conductors 24, 26 may be liquid filled fiberoptic devices as disclosed in U.S. Pat. No. 4,958,263, the disclosure of which is hereby incorporated by reference (both embodiments hereafter referred to as fiberoptic conductors). Fiberoptic conductors 24, 26 receive light (low and high beam light "L" and "H", respectively) from the light source(s) 14 and emit the light respectively to the apertures 28, 30 aligned with the conductors 24, 26. Apertures 28, 30 receive the light emitted from the corresponding fiberoptic conductors 24, 26 and pass the light to the single spherical lens 18.

The low and high beam fiberoptic conductors 24, 26 are disposed parallel to one another, with the low beam conductor 24 disposed above the high beam conductor 26. Similarly, the low and high beam apertures 28, 30 are disposed side-by-side and parallel to one another, with the low beam aperture 28 disposed above the high aperture 30. A hollow cylindrical end cap or ferrule 32 is inserted over and encompasses the end portions 24A, 26A of the fiberoptic conductors 24, 26. The ferrule 32 also defines the low and high beam apertures 28, 30 in its end face 32A aligned with the respective low and high beam fiberoptic conductors 24, 26.

The roadway illumination device 12 also includes a hollow cylindrical sleeve or coupling member 34 and a housing 36. The coupling member 34 is mounted to the housing 36 and has a cylindrical bore 34A allowing installation of the coupling member 34 over the ferrule 32 and end portions 24A, 26A of the low and high beam fiberoptic conductors 24, 26. Also, the coupling member 34 has a concave end face 34B the shape of spherical lens 18 so as to align the low and high beam apertures 28, 30 respectively above and below the longitudinal axis "A" of the spherical lens 18. The apertures 28, 30 are also spaced from the lens by an empty end portion 34C of the coupling member 34.

Further, the roadway illumination device 12 includes a pair of threaded stems 38 mounted through opposite and axially aligned threaded holes 40 in the housing 36. The stems 38 have concave-shaped inner ends 38A adapted to clamp against opposite top and bottom portions of the spherical lens 18 to retain the lens 18 in alignment with the apertures 28, 30. By turning threaded stems 38, the stems can be movably adjusted toward and away from the lens 18 for precisely locating it in aligned relationship with the apertures 28, 30. Then, by using lock nuts 42, the threaded stems 38 can be locked at their adjusted position. The lens 18 also protrudes through the open front side of the housing 36.

As noted in FIGS. 2-3, coupling member 34 may be spaced a slight distance from spherical lens 18. Such a spacing is necessary to permit alignment of spherical lens 18 with apertures 28, 30 using threaded stems 38. Alternatively, coupling member 34 may be bonded directly to lens 18. I that instance adjustment may be still made possible by use of an enlarged hole 44 in housing 36 so that coupling member 34 may move up or down, back and forth with the movement of lens 18 as it is aligned.

Such an arrangement is shown in FIG. 4, which also shows other alternatives which may be used individually or in various combinations. Thus, in FIG. 4 there is shown a vertical cylindrical lens 18' which may be used in place of spherical lens 18. In yet another embodiment which is not shown since in cross-section it would appear the same as shown in FIG. 2, a horizontal cylindrical lens may be used. In that instance a plurality of optical fibers and ferrules, as shown in my copending application Ser. No. 811,791, filed Dec. 20, 1991, or a splayed arrangement of output ends of a plurality of optical fibers and thin elongated apertures, as shown in my copending application Ser. No. 810,840, filed Dec. 20, 1991, may be used. In either event, as shown in FIG. 4, coupling member 34 may be bonded directly to the cylindrical lens. Installation and alignment is accomplished by threading fiberoptic conductors 24, 26, having coupling member 34 and vertical cylindrical lens 18' attached thereto into housing 36, through enlarged hole 44 and, then, using a single threaded stem 38 (which may be a set screw in this instance) to lock vertical cylindrical lens 18' in place. Hole 44 may thereafter be filled with a packing material (not shown) if desired.

In FIG. 5, there is shown yet another embodiment of the present invention. In this embodiment the automobile body itself serves as the housing. Thus automobile body parts 46, 48 are shaped to receive lens 18", which may be a spherical lens, a vertical cylindrical lens, or a horizontal cylindrical lens. Concave-shaped surfaces 46A and 48A as shown in FIG. 5 are designed to receive a spherical or horizontal cylindrical lens as shown. Flat surfaces such as those designated 38A in FIG. 4 would be used with a vertical cylindrical lens. In any event, set screw 50 is used to lock lens 18" in place between automobile body parts 46, 48 after installation and alignment.

Having thus described the fiberoptic multi-beam roadway illumination device of the present invention in detail and by reference to a preferred embodiment thereof, it will be apparent that modifications and variations are possible without departing from the scope of the invention defined in the appended claims.

What is claimed is:

1. A fiberoptic multi-beam roadway illumination device, comprising:
    a single optical lens having a center and a longitudinal axis extending through said center;
    means for defining separate beam light paths comprising:
    a pair of fiberoptic conductors disposed in parallel with one above the other to define a low and high beam for inputting low and high beam light into said lens respectively above and below said longitudinal axis of said lens and outputting the low and high beam light from said lens respectively below and above said longitudinal axis of said lens to thereby project respective low and high beams of light, and
    a ferrule inserted over end portions of said fiberoptic conductors and defining apertures in side-by-side relationship with the others of said apertures, each of said apertures for receiving light emitted from a corresponding one of said fiberoptic conductors and passing light to said lens at separate locations relative to said longitudinal axis and to thereby project respective separate multiple beams of light, and
    a hollow cylindrical coupling member inserted over said ferrule and engaged with said lens, said coupling member disposing said apertures in said ferrule in spaced relation from said lens, and
    means for adjusting the alignment of said lens.

2. The device of claim 1 wherein said single lens has a spherical, vertical cylindrical, or horizontal cylindrical shape.

3. A lighting system, comprising:
    at least one light source for transmitting light;
    a single optical lens with a center and a longitudinal axis extending through said center; and
    means for defining separate beam light paths extending in a predetermined relationship with said longitudinal axis of said single lens comprising at least two separate serial arrangements of fiberoptic conductors and apertures, each of said fiberoptic conductors coupled to said at least one light source for respectively receiving low and high beam light from said light source and emitting light to a corresponding one of said apertures, each of said apertures for receiving light emitted from a corresponding one of said fiberoptic conductors and passing light to said lens to thereby respectively project separate multiple beams of light.

4. The system of claim 3 wherein said separate light path-defining means also includes a ferrule inserted over end portions of said fiberoptic conductors and defining said apertures in side-by-side relationship with the others of said apertures.

5. The system of claim 4 wherein said separate light path-defining means also includes a hollow cylindrical coupling member inserted over said ferrule and engaged with said lens, said coupling member disposing said apertures in said ferrule in spaced relation from said lens.

6. The system of claim 5 further comprising:
    a housing, said coupling member mounted within said housing; and
    means mounted to said housing for clamping said lens in said predetermined relationship with said low and high beam light paths defined by said fiberoptic conductors and said apertures in said ferrules.

7. The system of claim 3 wherein said single lens has a spherical, vertical cylindrical, or horizontal cylindrical shape.

8. The system of claim 7 further including means for adjusting the alignment of said lens.

9. The system of claim 3 wherein said at least one source of light comprises at least two sources of light of different colors and said means for defining separate beam light paths comprises fiberoptic conductors corresponding in number with the number of sources of light, each fiberoptic conductor coupled to a different source of light, whereby different separate colored beams of light are projected.

10. The system of claim 9 further including a light control whereby said different separate colored beams of light may be projected separately or simultaneously.

11. A lighting system, comprising:
    a light source for separately transmitting low and high beam light;
    a single spherical lens with a center and a longitudinal axis extending through said center;
    means for defining separate low and high beam light paths extending in a predetermined relationship with said longitudinal axis of said single spherical lens, said separate light path-defining means being coupled to said light source for respectively receiving low and high beam light from said light source and for inputting the low and high beam light into said spherical lens respectively above and below said longitudinal axis of said lens such that the low and high beam light is outputted from said spherical lens respectively below and above said longitudinal axis of said lens to thereby respectively project low and high beams of light, wherein said separate light path—defining means includes a pair of separate serial arrangements of fiberoptic conductors and apertures, each of said fiberoptic conductors coupled to said light source for respectively receiving low and high beam light from said light source and emitting light to a corresponding one of said apertures, each of said apertures for receiving light emitted from a corresponding one of said fiberoptic conductors and passing light to said spherical lens; and
    means for controlling said light source for selectively and alternately turning on and off the transmitting of low and high beam light.

12. The system of claim 11 wherein one of said fiberoptic conductors is disposed parallel to and above the other of said fiberoptic conductors, and one of said apertures is disposed parallel to and above the other of said apertures.

13. The system of claim 11 wherein said separate light path-defining means also includes a ferrule inserted over end portions of said fiberoptic conductors and defining said apertures in side-by-side relationship with one of said apertures disposed above the other of said apertures.

14. The system of claim 13 wherein said separate light path-defining means also includes a hollow cylindrical coupling member inserted over said ferrule and engaged with said spherical lens, said coupling member disposing said apertures in said ferrule respectively above and below said longitudinal axis of said spherical lens and in spaced relation from said lens.

* * * * *